J. L. CREVELING.
ELECTRIC REGULATION.
APPLICATION FILED FEB. 16, 1912. RENEWED FEB. 10, 1919.
1,315,762. Patented Sept. 9, 1919.
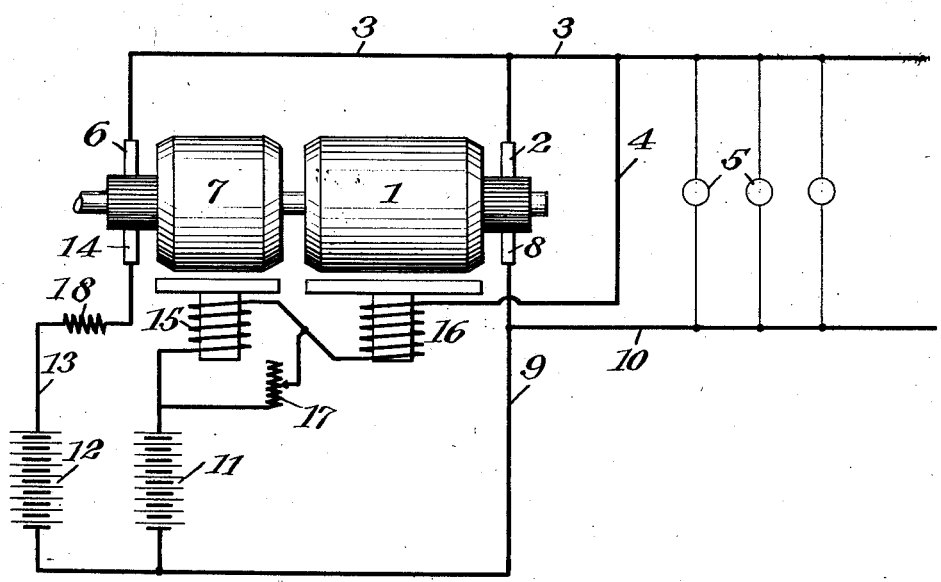
WITNESSES
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,315,762. Specification of Letters Patent. Patented Sept. 9, 1919.

Application filed February 16, 1912, Serial No. 678,074. Renewed February 10, 1919. Serial No. 276,177.

*To all whom it may concern:*

Be it known that I, JOHN L. CREVELING, a resident of New York, in the county and State of New York, have invented certain new and useful Improvements in Electric Regulations, as set forth in the annexed specification and drawing, forming a part thereof.

My invention pertains to that class of electric regulation wherein it is desired to regulate a plurality of dynamos or generators in a predetermined manner and has for a particular object to provide means whereby the dynamos may be automatically regulated throughout wide changes in speed and used to charge a storage battery and operate lamps or other translating devices as will hereinafter appear.

The drawing is a diagrammatic representation of one type of electric system comprehending my invention.

In the drawing, 1 represents the armature of a dynamo, the positive brush 2 of which is connected with the lead 3, which is in communication with the wire 4 and the positive side of the lamps or translating devices 5 and with the negative brush 6 of the armature 7. The negative brush 8 of the armature 1 is connected with the wire 9 in communication with the negative terminals of the translating devices 5 as by wire 10. The wire 9 is connected with the negative terminals of the storage batteries 11 and 12, the positive side of the battery 12 being connected as by wire 13 with the positive brush 14 of the armature 7, preferably driven by the same shaft as armature 1. The positive terminal of the battery 11 is connected to one end of the coarse field winding 15 of the armature 7, and the opposite end of said winding is in connection with one end of the coarse field winding 16 of the armature 1. The remaining terminal of the winding 16 is connected with the lead 3, as by wire 4. 17 is a variable resistance placed as a shunt to the magnet 15 for the purpose of adjusting the operation of the dynamo controlled by the same. 18 is a resistance which may be placed in series with the wire 13 to prevent too great a flow of current therethrough if desired.

An operation of my invention is substantially as follows, starting with the generators as running at some speed above the lowest speed at which they are designed to supply the system:

The fields of the dynamos having armatures 1 and 7 are set up by the windings 16 and 15 respectively, and these are energized by the storage battery 11, by current from the storage battery 11 flowing through the said field windings and wire 4 to the lead 3 and returning either through translating devices 5, wire 10 and wire 9 to the battery 11 or through wire 3, brush 6, armature 7, brush 14, wire 13, storage battery 12 and wire 9 to the battery, or through both these paths. Therefore, it will be obvious that the voltage of the armature 1 of the voltage across the translation devices in circuit with which the field windings 15 and 16 are placed in series with each other can never equal or exceed the voltage of the battery 11, regardless of the speed of the armature 1, for if the voltage across the armature 1 and the translation circuit were to equal the voltage of the battery 11, there would be no excitation of the field of the armature 1. However, by making the field windings 15 and 16 of as low resistance as possible and using a storage battery 11 with a very low internal resistance, I am able to cause wide variations in the strength of the field magnets 15 and 16 upon very small variations in electromotive force across the field windings. Therefore, the electromotive force of the armature 1 will remain substantially constant at a value slightly below the voltage of the battery 11 throughout very great increases in speed of rotation, a slight increase in the voltage of said armature, causing a large diminution in the field current and consequent field strength. As the armature 7 is in series with the storage battery 12 and these two elements, thus arranged, are in shunt to the armature 1 and the translation circuit and as the electromotive force of the armature 7 is added to that of the armature 1 and translation circuit, a higher voltage will be held across the storage battery 12 than across the generator 1 and the translation circuit, which, if of sufficient value, will cause the battery 12 to be charged and, I so adjust the current in the coil 15, as by means of the adjustable shunt 17, that the electromotive force of the armature 7, which will remain constant throughout very wide speed changes for the same reason as the armature 1, shall be that amount desired to have impressed upon the battery 12 above that of the armature 1 and the translation circuit. The resistance 18 may be placed in the wire 13, if desired, to prevent too great a current flowing through the battery in case its electromotive force be very low. Therefore, as the speed of the generators varies above the minimum desired working speed, the voltage upon the translation circuit remains substantially constant throughout wide changes in speed and load and the voltage across the battery 12 remains substantially constant at a value equal to that across the armature 1 and the translation circuit plus the voltage of the armature 7 which will also remain substantially constant and, therefore, the battery 12 will be charged upon a constant voltage circuit and the lamps or translating devices will be supplied at substantially a constant voltage throughout great changes in speed of rotation of the armatures of the generators.

It will be noted that I have purposely omitted any switches in the various circuits and any operation of my invention except that when the generators are working at or above the desired minimum working speed, which is sufficient to explain my invention with the system in operation under normal running conditions, means for handling the various instrumentalities and circuits under other conditions, as for example, stopping and starting, are purposely omitted as they form no part of the present invention and are the subject matter of separate applications.

I do not wish in any way to limit myself to the exact details of construction and arrangement nor to the exact details of operation given above to illustrate one form of my invention, for it will be obvious that wide departure in the way of details may be made without departing from the spirit and scope of my invention, which is as set forth in the following claims:

1. In apparatus of the class described, the combination with a generator comprising two sources of current at different voltages, a field circuit therefor, a storage battery in a series circuit with both said sources, a translation circuit in operative relation with one of said sources, a second storage battery in series with said field circuit and in communication with said translation circuit, and means for adjusting the relative voltages of said generator at a given speed.

2. In apparatus of the class described, the combination with a pair of generators having armatures subject to the same variations in speed and having individual fields of low resistance windings, of a storage battery in series with both of said armatures, a translation circuit in operative relation with one of said armatures, a second storage battery in series with said low resistance field windings and in communication with said translation circuit, and means for adjusting the relative strengths of said individual fields.

3. In apparatus of the class described, the combination with a pair of generators having armatures subject to the same variations in speed and having individual fields of low resistance windings, of a storage battery in series with both of said armatures, a translation circuit in operative relation with one of said armatures, a second storage battery in series with said low resistances field windings and in communication with said translation circuit, and means for adjusting the strength of one of said individual fields.

JOHN L. CREVELING.

Witnesses:
ALFONSE F. SPIEGEL,
ANNA M. WALL.